(12) United States Patent
Niimi et al.

(10) Patent No.: US 9,884,568 B2
(45) Date of Patent: Feb. 6, 2018

(54) CONTROL APPARATUS AND CONTROL METHOD OF VEHICLE

(71) Applicant: TOYOTA JIDOSHA KABUSHIKI KAISHA, Toyota-shi, Aichi-ken (JP)

(72) Inventors: Yoshitaka Niimi, Susono (JP); Wanleng Ang, Gotenba (JP); Masaki Okamura, Toyota (JP); Shintaro Tsujii, Chiryu (JP); Keisuke Morisaki, Toyota (JP); Hideaki Yaguchi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 100 days.

(21) Appl. No.: 15/029,858

(22) PCT Filed: Oct. 15, 2014

(86) PCT No.: PCT/IB2014/002125
§ 371 (c)(1),
(2) Date: Apr. 15, 2016

(87) PCT Pub. No.: WO2015/056081
PCT Pub. Date: Apr. 23, 2015

(65) Prior Publication Data
US 2016/0250946 A1  Sep. 1, 2016

(30) Foreign Application Priority Data
Oct. 18, 2013 (JP) .................................. 2013-217134

(51) Int. Cl.
*B60L 9/00* (2006.01)
*B60L 15/20* (2006.01)
(Continued)

(52) U.S. Cl.
CPC .............. *B60L 15/20* (2013.01); *B60K 28/16* (2013.01); *B60L 3/0076* (2013.01); *B60L 3/10* (2013.01);
(Continued)

(58) Field of Classification Search
CPC ......... B60K 28/16; B60L 15/20; B60L 3/102; B60L 3/106; B60L 3/108; B60L 7/003;
(Continued)

(56) References Cited

U.S. PATENT DOCUMENTS 5,208,741 A * 5/1993 Kumar ...................... H02P 3/22
318/375
5,686,839 A    11/1997 Takagi
(Continued)

FOREIGN PATENT DOCUMENTS

GB    2474321 A    4/2011
JP    H07-241002 A    9/1995
(Continued)

*Primary Examiner* — Hussein Elchanti
(74) *Attorney, Agent, or Firm* — Andrews Kurth Kenyon LLP

(57) ABSTRACT

A control apparatus for a vehicle including a three-phase AC motor and a power converter, the control apparatus includes an ECU. The ECU is configured to determine whether a rotation speed of the three-phase AC motor is equal to or less than a predetermined threshold and whether a stopping operation of the vehicle is performed, to determine that the vehicle stops when the rotation speed is equal to or less than the predetermined threshold and the stopping operation is performed, to determine whether the vehicle skids, and to switch a state of the power converter to a state where all on one side of the first and second switching elements are turned off and at least one on the other side of the first and
(Continued)

second switching elements is turned on when the ECU determines that the vehicle stops and that the vehicle does not skid.

6 Claims, 9 Drawing Sheets

(51) Int. Cl.
    *B60K 28/16*       (2006.01)
    *B60L 3/00*        (2006.01)
    *B60L 3/10*        (2006.01)
    *B60L 7/00*        (2006.01)
    *B60T 8/88*        (2006.01)
    *B60W 30/18*      (2012.01)

(52) U.S. Cl.
    CPC ............... *B60L 3/102* (2013.01); *B60L 3/106* (2013.01); *B60L 3/108* (2013.01); *B60L 7/003* (2013.01); *B60L 15/2009* (2013.01); *B60L 15/2018* (2013.01); *B60T 8/885* (2013.01); *B60W 30/18172* (2013.01); *B60L 2240/465* (2013.01); *B60L 2260/10* (2013.01); *B60L 2260/26* (2013.01); *B60T 2201/04* (2013.01); *Y02T 10/644* (2013.01); *Y02T 10/645* (2013.01); *Y02T 10/7275* (2013.01)

(58) Field of Classification Search
    CPC .... B60L 15/2009; B60L 15/2018; B60L 3/10; B60L 3/0076; B60T 8/885; B60W 30/18172
    See application file for complete search history.

(56) References Cited

U.S. PATENT DOCUMENTS

| | | | | |
|---|---|---|---|---|
| 6,043,996 | A * | 3/2000 | Kumar | H02M 7/5395 318/375 |
| 2003/0158635 | A1* | 8/2003 | Pillar | A62C 27/00 701/1 |
| 2008/0303459 | A1* | 12/2008 | Furukawa | B60K 6/46 318/142 |
| 2009/0140742 | A1* | 6/2009 | Koch | G01R 31/3606 324/426 |
| 2010/0125384 | A1* | 5/2010 | Wyatt | B60K 7/0007 701/22 |
| 2011/0187185 | A1* | 8/2011 | Dupuy | B60L 11/1803 307/10.1 |
| 2014/0168827 | A1* | 6/2014 | Mirzaei | H02H 3/253 361/31 |
| 2014/0217944 | A1* | 8/2014 | Yang | H02P 6/18 318/400.34 |
| 2015/0191099 | A1* | 7/2015 | Fink | B60L 3/0046 318/139 |
| 2016/0221469 | A1* | 8/2016 | Cheng | B60K 6/48 |

FOREIGN PATENT DOCUMENTS

| | | |
|---|---|---|
| JP | 2004306865 A | 11/2004 |
| JP | 2006-288051 A | 10/2006 |
| JP | 2015-033292 A | 2/2015 |
| WO | 2015/019155 A2 | 2/2015 |

\* cited by examiner

US 9,884,568 B2

CONTROL APPARATUS AND CONTROL METHOD OF VEHICLE

CROSS-REFERENCE TO RELATED APPLICATIONS

This is a national phase application based on the PCT International Patent Application No. PCT/IB2014/002125 filed Oct. 15, 2014, claiming priority to Japanese Patent Application No. 2013-217134 filed Oct. 18, 2013, the entire contents of both of which are incorporated herein by reference.

BACKGROUND OF THE INVENTION

1. Field of the Invention

The present invention relates to a control apparatus and a control method of a vehicle.

2. Description of Related Art

In recent years, vehicles including an electric motor have attracted attention. As an example of such a vehicle including an electric motor, a hybrid vehicle including both of an electric motor and an internal combustion engine is known (for example, see Japanese Patent Application Publication No. 2006-288051 (JP 2006-288051 A)).

JP 2006-288051 A discloses a technique of performing three-phase short-circuit control on the electric motor so as to promptly stop the rotation of the internal combustion engine when the rotation speed of the internal combustion engine is less than a predetermined rotation speed in such a hybrid vehicle.

When the vehicle skids due to an ascending gradient or the like at the time of performing the three-phase short-circuit control, the electric motor may be dragged into a three-phase short-circuit state and, for example, vibration due to a torque ripple or torque shock may occur. Such a vehicle skid can occur even when the rotation speed of the internal combustion engine is low. Accordingly, for example, as in the technique disclosed in JP 2006-288051 A, when it is determined whether the vehicle stops on the basis of the determination result of whether the rotation speed of the internal combustion engine is less than a predetermined rotation speed, it may be difficult to determine whether a skid occurs. Accordingly, when the three-phase short-circuit control is performed as stopping control, it may be difficult to avoid the vibration or the torque shock.

SUMMARY OF THE INVENTION

The invention provides a control apparatus and a control method of a vehicle that can determine whether the vehicle skids and perform stopping control.

According to a first aspect of the invention, a controller control apparatus for a vehicle, the vehicle including a three-phase AC motor and a power converter, the three-phase AC motor is driven at a rotation speed synchronized with a rotation speed of a drive shaft of the vehicle, and the power converter includes a first switching element and a second switching element, which are connected in series to each other, for each of three phases of the three-phase AC motor and that converts electric power supplied to the three-phase AC motor from DC power to AC power, the control apparatus including an electronic control unit. The electronic control unit is configured to (i) determine whether the rotation speed of the three-phase AC motor is equal to or less than a predetermined threshold value and whether a stopping operation that stops the vehicle is performed, (ii) determine that the vehicle stops when the rotation speed of the three-phase AC motor is equal to or less than the predetermined threshold value and the stopping operation is performed, (iii) determine whether the vehicle skids, and (iv) switch a state of the power converter to a state where all on one side of the first switching elements and the second switching elements are turned off and at least one on the other side of the first switching elements and the second switching elements is turned on when the electronic control unit is configured to determine that the vehicle stops and the vehicle, does not skid.

According to this configuration, it is possible to control a vehicle including a three-phase AC motor. The three-phase AC motor is installed in the vehicle so that the rotation speed of the three-phase AC motor is synchronized with the rotation speed of the drive shaft of the vehicle. "The state in which the rotation speed of the three-phase AC motor is synchronized with, the rotation speed of the drive shaft" means a state in which the rotation speed of the three-phase AC motor and the rotation speed of the drive shaft have a correlation. For example, "the state in which the rotation speed of the three-phase AC motor is synchronized with the rotation speed of the drive shaft" means a state in which the rotation speed of the three-phase AC motor is proportional to the rotation speed of the drive shaft (that is, a state in which the rotation speed of the three-phase AC motor×K (where K is an integer) the rotation speed of the drive shaft is satisfied). "The state in which the rotation speed of the three-phase AC motor is synchronized with the rotation speed of the drive shaft" may be embodied by directly connecting the rotation shaft of the three-phase AC motor to the drive shaft. Alternatively, "the state in which the rotation speed of the three-phase AC motor is synchronized with the rotation speed of the drive shaft" may be embodied by indirectly connecting the rotation shaft of the three-phase AC motor to the drive shaft via a certain mechanical mechanism (for example, a reduction gear mechanism).

The three-phase AC motor is driven using electric power (that is, AC power) supplied from the power converter. The power converter includes the first switching element (for example, a switching element electrically connected between a high-voltage terminal of a power source and the three-phase AC motor) and the second switching element (for example, a switching element electrically connected between a low-voltage terminal of the power source and the three-phase AC motor), which are connected in series to each other, for each of three phases so as to supply electric power to the three-phase AC motor. That is, the power converter includes the first and second switching elements disposed in a U phase, the first and second switching elements disposed in a V phase, and the first and second switching elements disposed in a W phase.

According to the above-mentioned configuration, the control apparatus determines whether the vehicle including the three-phase AC motor stops.

The electronic control unit performs determination based on the rotation speed of the three-phase AC motor. Specifically, the electronic control unit determines whether the rotation speed of the three-phase AC motor is equal to or less than a predetermined threshold value. Then, the electronic control unit performs determination based on a stopping operation capable of stopping the vehicle. Specifically, the electronic control unit determines whether the stopping operation capable of stopping the vehicle is performed.

The electronic control unit determines that the vehicle stops when it is determined that the rotation speed of the three-phase AC motor is equal to or less than the predetermined threshold value and that the stopping operation is performed. On the other hand, the electronic control unit may determine that the vehicle does not stop when it is determined that, the rotation speed of the three-phase AC motor is not equal to or less than the predetermined threshold value. Similarly, the electronic control unit may determine that the vehicle does not stop when it is determined that the stopping operation is not performed.

According to the above-mentioned configuration, it is possible to determine whether the vehicle stops on the basis of the stopping operation as well as the rotation speed of the three-phase AC motor. Accordingly, the control apparatus of the vehicle according to this aspect can determine whether the vehicle stops with relatively high accuracy, compared with a vehicle control apparatus that determines that the vehicle stops when the rotation speed of an internal combustion engine of which detection accuracy may be lower than the detection accuracy of the rotation speed of the three-phase AC motor is equal to or less than a predetermined threshold value. The control apparatus of a vehicle according to this aspect can determine whether the vehicle stops with relatively high accuracy, compared with a vehicle control apparatus that determines that the vehicle stops when the rotation speed of the three-phase AC motor is equal to or less than a predetermined threshold value without determining whether a stopping operation is performed.

The electronic control unit may determine whether the vehicle stops on the basis of the period in which the state in which it is determined that the rotation speed of the three-phase AC motor is equal to or less than the predetermined threshold value and that the stopping operation is performed is maintained. The electronic control unit may determine that the vehicle does not stop when the maintenance period is not equal to or greater than a predetermined period. According to this determination, the electronic control unit can determine whether the vehicle stops with higher accuracy. For example, the electronic control unit can determine whether the vehicle stops with higher accuracy even when the rotation speed of the three-phase AC motor hunts (or fluctuates).

The electronic control unit determines whether the vehicle skids. Skid means a state where the vehicle runs against a driver's intention due to a slope of a road on which the vehicle runs and can occur, for example, when the vehicle is intended to stop in the way of a relatively-steep slope. In addition, regarding determining what degree of running is a skid, for example, a threshold value of a determination parameter can be set in advance as a value capable of avoiding a problem due to the skid to be described later theoretically, experimentally, or empirically.

The electronic control unit is configured to determine whether the vehicle skids, for example, on the basis of the rotation angle or the rotation speed of the three-phase AC motor. When the vehicle includes an electric motor other than the three-phase AC motor or an internal combustion engine, it may be determined whether the vehicle skids on the basis of the rotation angle or the rotation speed of the other electric motor or the internal combustion engine, instead of or in addition to the rotation angle or the rotation speed of the three-phase AC motor. Alternatively, it may be determined whether the vehicle skids on the basis of a slope angle sensor or the like (that is, on the basis of a slope angle of a road).

When it is determined that the vehicle stops and it is determined that the vehicle does not skid, the electronic control unit switches the state of the power converter to a state (hereinafter, referred to as specific state) in which all on one side of the first switching elements and the second switching elements are turned off (that is, disconnected state) and at least one on the other side of the first switching elements and the second switching elements is turned on (that is, connected state). By switching the power converter to the specific state, it is possible to generate a braking force in the three-phase AC motor and to perform, for example, control of stopping the vehicle. In a vehicle including another three-phase AC motor in addition to the three-phase AC motor according to this aspect, a power converter corresponding to the other three-phase AC motor may be controlled so that the state thereof is switched to the specific state.

When the state of the power converter is switched to the specific state, electric power required for the vehicle running may not be supplied to the three-phase AC motor from the power converter. Accordingly, in this aspect, the electronic control unit controls the power converter so as to switch the state of the power converter to the specific state when it is determined that the vehicle stops. As described above, the electronic control unit can determine whether the vehicle stops with high accuracy. Accordingly, when the vehicle stops, it is possible to control the power converter so as to switch the state of the power converter to the specific state. That is, the electronic control unit can control the power converter so as to switch the state of the power converter to the specific state at a timing at which the running of the vehicle is not affected.

When the state of the power converter is switched to the specific state and the vehicle skids, vehicle vibration due to a torque ripple of a drag torque of the three-phase AC motor or torque shock due to the control of the power converter in a state where the speed of the vehicle is relatively high (specifically, control of releasing the specific state) may occur. Accordingly, in this aspect, the electronic control unit controls the power converter so as to switch the state of the power converter to the specific state when it is determined that the vehicle does not skid. Therefore, the electronic control unit can control the power converter so as to switch the state of the power converter to the specific state at a timing at which the vehicle vibration or the torque shock will not occur. When there is a possibility that the vehicle vibration or the torque shock will occur after the state of the power converter is switched to the specific state, the electronic control unit can control the power converter so as to release the specific state.

As described above, according to the first aspect, since it can be determined with high accuracy whether the vehicle stops and it can be determined whether the vehicle skids, it is possible to control the three-phase AC motor at the time of performing the stopping operation.

In the control apparatus of a vehicle, the electronic control unit may be configured to determine whether the vehicle skids based on a rotation angle of the three-phase AC motor.

According to this configuration, the rotation angle of the three-phase AC motor is detected, for example, by a rotation angle detector such as a resolver disposed in the three-phase AC motor when determining whether the vehicle skids. The electronic control unit determines whether the vehicle skids on the basis of the detected value of the rotation angle of the three-phase AC motor. Specifically, for example, the electronic control unit determines whether the vehicle skids depending on whether the variation in the rotation angle of the three-phase AC motor is greater than a threshold value.

According to the above-mentioned configuration, it is possible to determine whether the vehicle skids with a relatively simple configuration. A value of an electrical angle or a value of a mechanical angle may be used as the rotation angle of the three-phase AC motor.

In the control apparatus of a vehicle, the electronic control unit may be configured to determine whether the vehicle skids based on a difference between the current rotation angle of the three-phase AC motor and the previous rotation angle of the three-phase AC motor.

According to this configuration, when determining whether the vehicle skids, the difference between the current rotation angle of the three-phase AC motor and the previous rotation angle of the three-phase AC motor is calculated. The previous rotation angle of the three-phase AC motor is a rotation angle detected immediately before detecting the current rotation angle of the three-phase AC motor, and the detected value can be stored in a memory or the like and then can be read if necessary.

The electronic control unit according to this aspect determines whether the vehicle skids on the basis of the difference in the rotation angle. For example, it is determined whether the vehicle skids depending on whether the difference in the rotation angle is greater than a threshold value for a predetermined period. According to this determination, it is possible to determine whether the vehicle skids with a relatively simple configuration.

In the control apparatus of a vehicle, the electronic control unit may be configured to determine whether the vehicle skids based on the rotation speed of the three-phase AC motor.

According to this configuration, the rotation speed (that is, rotation velocity) of the three-phase AC motor is detected, for example, by a rotation speed detector such as a resolver disposed in the three-phase AC motor when determining whether the vehicle skids. The electronic control unit determines whether the vehicle skids on the basis of the detected value of the rotation speed of the three-phase AC motor. For example, it is determined whether the vehicle skids depending on whether the magnitude of the rotation speed of the three-phase AC motor is greater than a threshold value.

According to the above-mentioned configuration, it is possible to determine whether the vehicle skids with a relatively simple configuration. The same value as used for the determination of whether the vehicle stops may be used as the value of the rotation speed of the three-phase AC motor. In this case, since it is not necessary to newly detect the rotation speed, it is possible to simplify the process.

In the control apparatus of a vehicle, the electronic control unit may be configured to determine whether the vehicle skids based on an average value of the rotation speed of the three-phase AC motor in a predetermined period.

According to this configuration, the rotation speed of the three-phase AC motor is detected multiple times in a predetermined period and is calculated as an average value in the predetermined period. The electronic control unit determines whether the vehicle skids on the basis of the calculated average value in the predetermined period.

According to the above-mentioned configuration, it is possible to reduce an influence of noise or the like which can be included in the detected rotation speed by using the average value of the rotation speed of the three-phase AC motor. Accordingly, it is possible to determine whether the vehicle skids with higher accuracy.

According to a second aspect of the invention, a control method for a vehicle, the vehicle including a three-phase AC motor and a power converter, the three-phase AC motor is driven at a rotation speed synchronized with a rotation speed of a drive shaft of the vehicle, and the power converter that includes a first switching element and a second switching element, which are connected in series to each other, for each of three phases of the three-phase AC motor and that converts electric power supplied to the three-phase AC motor from DC power to AC power, the control method including: determining whether the rotation speed of the three-phase AC motor is equal to or less than a predetermined threshold value and whether a stopping operation that stops the vehicle is performed; determining that the vehicle stops when the rotation speed of the three-phase AC motor is equal to or less than the predetermined threshold value and the stopping operation is performed; determining whether the vehicle skids; and switching a state of the power converter to a state where all on one side of the first switching elements and the second switching elements are turned off and at least one on the other side of the first switching elements and the second switching elements is turned on when it is determined that the vehicle stops and it is determined that the vehicle does not skid.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of a control apparatus of a vehicle will be described.

First, a first embodiment of the invention will be described below with reference to FIGS. 1 to 6.

Figure 1:
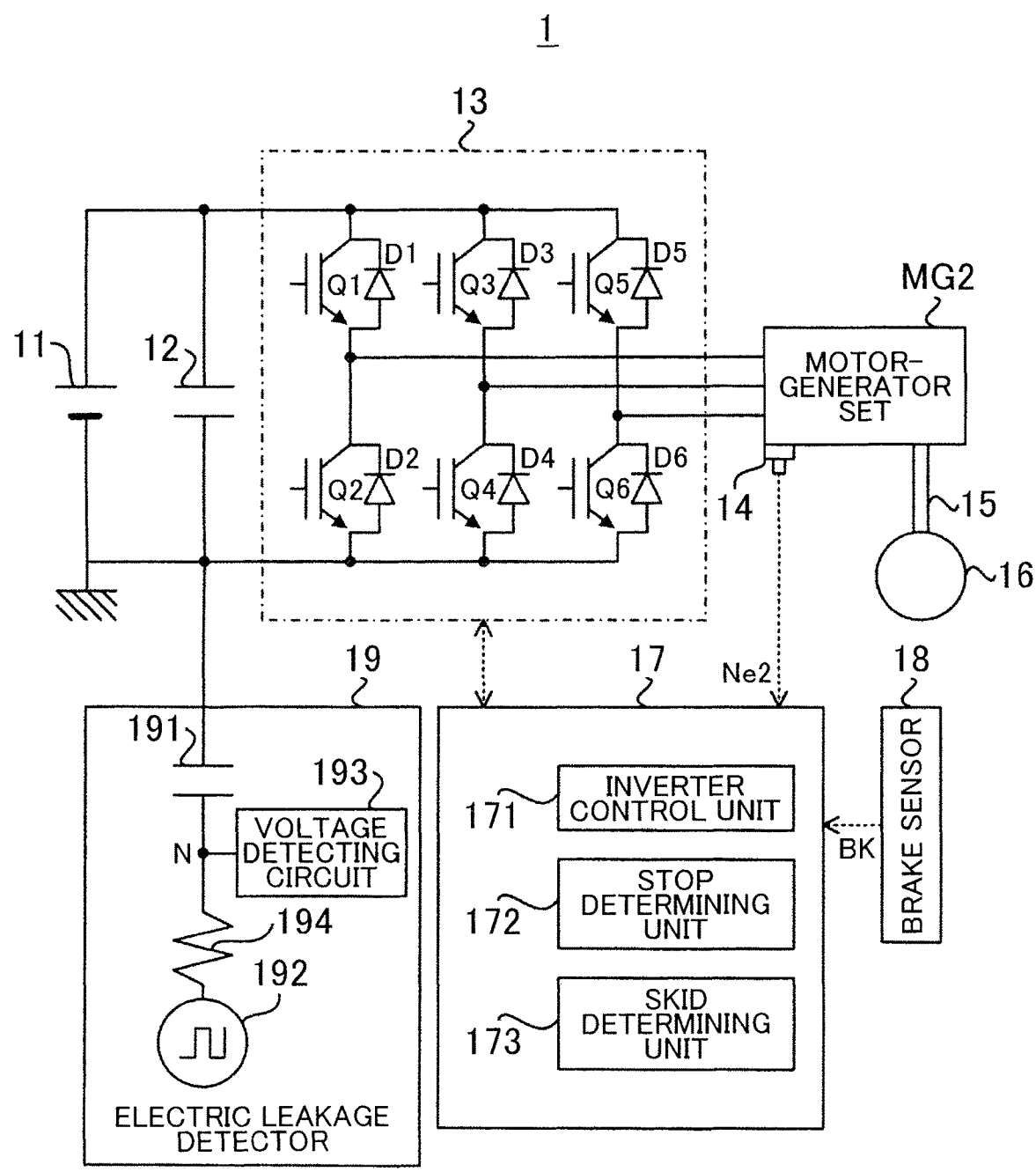
FIG. 1 is a block diagram illustrating a configuration of a vehicle according to a first embodiment of the invention.

A configuration of a vehicle 1 according to the first embodiment will be described with reference to FIG. 1. FIG. 1 is a block diagram illustrating the configuration of the vehicle 1 according to the first embodiment.

As illustrated in FIG. 1, the vehicle 1 includes a DC power source 11, a smoothing capacitor 12, an inverter 13, a motor-generator MG2, a rotation angle sensor 14, a drive shaft 15, a driving wheel 16, an electronic control unit (ECU) 17, a brake sensor 18, and an electric leakage detector 19. The inverter 13 is a specific example of a "power converter". The motor-generator MG2 is a specific example of a "three-phase AC motor". The ECU 17 is a specific example of a "vehicle control apparatus".

The DC power source 11 is an electric storage device capable of being charged. Examples of the DC power source 11 include a secondary battery (for example, a nickel-hydrogen battery or a lithium-ion battery) and a capacitor (for example, an electric double-layer capacitor or a large-capacity capacitor).

The smoothing capacitor 12 is a voltage-smoothing capacitor that is connected between a positive electrode line of the DC power source 11 and a negative electrode line of the DC power source 11.

The inverter 13 converts DC power (DC voltage) supplied from the DC power source 11 into AC power (three-phase AC voltage). In order to convert the DC power (DC voltage) into the AC power (three-phase AC voltage), the inverter 13 includes a U-phase arm including a p-side switching element Q1 and an n-side switching element Q2, a V-phase arm including a p-side switching element Q3 and an n-side switching element Q4, and a W-phase arm including a p-side switching element Q5 and an n-side switching element Q6. The arms of the inverter 13 are connected in parallel between the positive electrode line and the negative electrode line. The p-side switching element Q1 and the n-side switching element Q2 are connected in series between the positive electrode line and the negative electrode line. The same is true of the p-side switching element Q3 and the n-side switching element Q4 and the p-side switching element Q5 and the n-side switching element Q6. A rectification diode D1 that causes a current to flow from the emitter terminal of the p-side switching element Q1 to the collector terminal of the p-side switching element Q1 is connected to the p-side switching element Q1. Similarly, rectification diodes D2 to D6 are connected to the n-side switching element Q2 to the n-side switching element Q6, respectively. Midpoints between the p-side switching elements (hereinafter, referred to as an upper arm) and the n-side switching elements (hereinafter, referred to as a lower arm) of the phase arms in the inverter 13 are connected to phase coils of the motor-generator MG2. As a result, AC power (three-phase AC voltage) generated by the converting operation of the inverter 13 is supplied to the motor-generator MG2.

The motor-generator MG2 is a three-phase AC motor. The motor-generator MG2 is driven to generate a torque required for causing the vehicle 1 to run. The torque generated by the motor-generator MG2 is transmitted to the driving wheels 16 via a drive shaft. 15 mechanically connected to the rotation shaft of the motor-generator MG2. The motor-generator MG2 may regenerate electric power (generate electric power) at the time of braking the vehicle 1.

The rotation angle sensor 14 detects the rotation angle θ2 and the rotation speed Ne2 of the motor-generator MG2 (that is, the rotation angle and the rotation speed of the rotation shaft of the motor-generator MG2). It is preferable that the rotation angle sensor 14 directly detect the rotation angle θ2 and the rotation speed Ne2 of the motor-generator MG2. Examples of the rotation angle sensor 14 include a resolver such as a rotary encoder. It is preferable that the rotation angle sensor 14 output the detected rotation angle θ2 and the detected rotation speed Ne2 to the ECU 17.

The ECU 17 is an electronic control unit that controls the operation of the vehicle 1. The ECU 17 according to this embodiment is a physical, logical, or functional processing block and includes an inverter control unit 171, a stop determining unit 172, and a skid determining unit 173. The inverter control unit 171 is a specific example of "control means". The stop determining unit 172 is a specific example of "first determination means" and "second determination means". The skid determining unit 173 is a specific example of "skid determining means".

The inverter control unit 171 is a processing block that controls the operation of the inverter 13. The inverter control unit 171 may control the operation of the inverter 13 using a known control method. For example, the inverter control unit 171 may control the operation of the inverter 13 using a pulse width modulation (PWM) control method.

The stop determining unit 172 performs stop determination for determining whether the motor-generator MG2 stops. The stop determination will be described later in detail (see FIGS. 2 and 3) and detailed description thereof will not be made here.

The skid determining unit 173 performs skid determination for determining whether the vehicle 1 skids. The skid determination will be described later in detail (see FIG. 4 and the like) and detailed description thereof will not be made here. In consideration of the configuration in which the drive shaft 15 of the vehicle 1 is connected to the rotation shaft of the motor-generator MG2, the rotation speed of the drive shaft 15 of the vehicle 1 is synchronized with the rotation speed Ne2 of the rotation shaft of the motor-generator MG2. For example, the rotation speed of the drive shaft 15 of the vehicle 1 is proportional to the rotation speed Ne2 of the rotation shaft of the motor-generator MG2. Accordingly, when the rotation speed Ne2 of the rotation shaft of the motor-generator becomes zero with the stopping of the motor-generator MG2, the rotation speed of the drive shaft 15 also becomes zero. The state in which the rotation speed of the drive shaft 15 is zero is substantially equivalent to the state in which the vehicle 1 stops. Accordingly, the stopping of the motor-generator MG2 can be said, to correspond to the stopping of the vehicle 1. The stop determining unit 172 may determine whether the vehicle 1 stops, in addition to or instead of determining whether the motor-generator MG2 stops.

The brake sensor 18 detects a brake pedal pressure (that is, a parameter indicating a force for stepping on a foot brake) BK. It is preferable that the brake sensor 18 outputs the detected brake pedal pressure BK to the ECU 17.

The electric leakage detector 19 detects electric leakage in an electric system (so-called motor driving system) including the DC power source 11, the smoothing capacitor 12, the inverter 13, and the motor-generator MG2.

In order to detect the electric leakage, the electric leakage detector 19 includes a coupling capacitor 191, an oscillation circuit 192, a voltage detecting circuit 193, and a resistor 194.

An electric leakage detecting method by the electric leakage detector 19 is as follows. The oscillation circuit 192 outputs a pulse signal (or an AC signal) of a predetermined frequency. The voltage detecting circuit 193 detects a voltage of node E which varies with the pulse signal. Here, when electric leakage occurs in the electric system, an electric leakage path (for example, the electric leakage path is equivalent to a circuit including a resistor or a circuit in which a resistor and a capacitor are connected in parallel) extending from the electric system to a chassis ground is formed. As a result, the pulse signal output from the oscillation circuit 192 is transmitted via the path reaching the resistor 194, the coupling capacitor 191, and the electric leakage path. Accordingly, the voltage of the pulse signal at node E is affected by the impedance of the electric leakage Path (for example, the resistance value of the resistor included in the equivalent circuit of the electric leakage, path). As a result, by causing the voltage detecting circuit 193 to detect the voltage of node E, it is possible to detect electric leakage.

Figure 2:
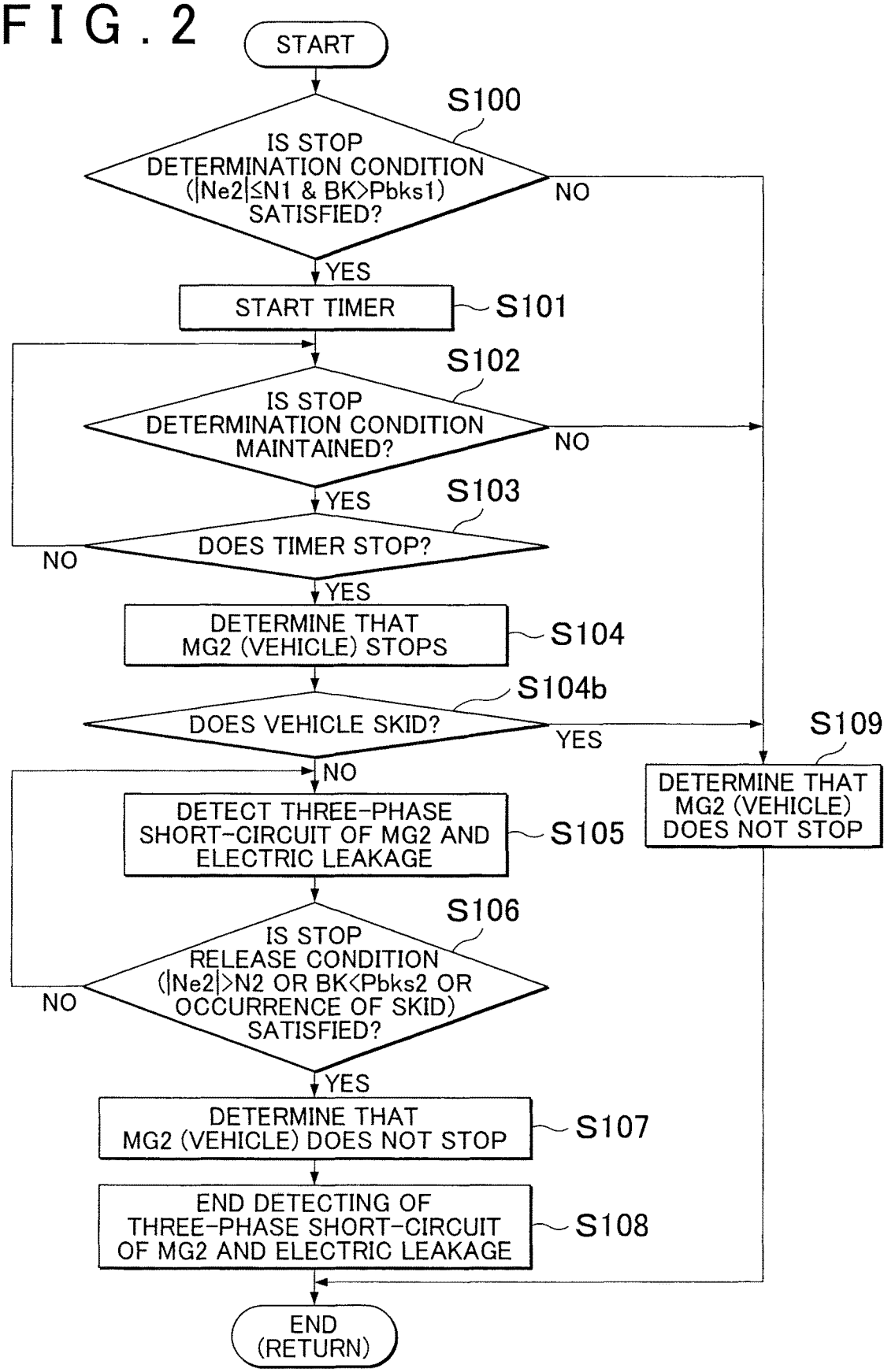
FIG. 2 is a flowchart illustrating a flow of a stopping determination process in the first embodiment.

The flow of a stop determination process (the stop determination process performed by the ECU 17) carried out in the vehicle 1 according to the first embodiment will be described below with reference to FIG. 2. FIG. 2 is a flowchart illustrating the flow of the stop determination process in the first embodiment.

As illustrated in FIG. 2, the stop determining unit 172 determines whether a predetermined stop determination condition is satisfied (step S100).

The stop determination condition includes a stop determination condition based on the rotation speed Ne2 of the motor-generator MG2. In FIG. 2, a condition in which the absolute value of the rotation speed Ne2 of the motor-generator MG2 is equal to or less than a predetermined threshold value N1 (that is, $|Ne2| \leq N1$ is satisfied) is used as an example of the stop determination condition based on the rotation speed Ne2.

As described above, the stopping of the motor-generator MG2 corresponds to the stopping of the vehicle 1. Accordingly, the predetermined threshold value N1 for determining the stopping of the motor-generator MG2 may be set to an appropriate value on the basis of the rotation speed Ne2 of the motor-generator MG2 measured in a state where the vehicle 1 stops. For example, when the "stopping of the vehicle 1" means a state in which the vehicle speed of the vehicle 1 is zero or substantially zero, the predetermined threshold value N1 may be set to a value equal to or greater than the rotation speed Ne2 of the motor-generator MG2 measured when the vehicle speed of the vehicle 1 is zero.

The stop determination condition includes a stop determination condition based on an operation (hereinafter, appropriately referred to as "stopping operation") capable of stopping the vehicle 1. In FIG. 2, a condition in which the brake pedal pressure BK is greater than a predetermined threshold value Pbks1 (that is, BK>Pbks1 is satisfied) is used as an example of the stop determination condition based on the stopping operation.

The stopping operation is performed, for example, on the basis of a driver's intention (that is, driver's autonomous operation). Here, the stopping operation may be performed automatically regardless of the driver's intention (for example, automatically under the control of the control apparatus such as the ECU 17). The situation in which the stopping operation is automatically performed can occur in the vehicle 1, for example, in which automatic driving control (that is, control of causing the vehicle 1 to automatically run regardless of the driver's operation) is performed.

The stop determination condition illustrated in FIG. 2 is only an example. Accordingly, a stop determination condition other than the stop determination condition illustrated in FIG. 2 may be used. For example, as long as the state in which the vehicle 1 stops and the state where the vehicle 1 does not stop can be distinguished depending on a characteristic difference of the rotation speed Ne2, an arbitrary condition using the characteristic difference of the rotation speed Ne2 may be used as the stop determination condition based on the rotation speed Ne2. Similarly, as long as the state in which the vehicle 1 stops and the state where the vehicle 1 does not stop can be distinguished depending on a characteristic difference of the stopping operation, an arbitrary condition using the characteristic difference of the stopping operation may be used as the stop determination condition based on the stopping operation.

It is preferable that the stop determination condition based on the stopping operation be a stop determination condition based on an operation for directly stopping the vehicle 1. Examples of the operation for directly stopping the vehicle 1 include an operation (for example, an operation of operating a brake such as a foot brake or a side brake) capable of causing a braking force to act on the vehicle 1 and an operation (for example, an operation of shifting a shift lever to a P range) that is likely to be performed when the vehicle stops. Accordingly, for example, the condition in which a brake is operated may be used as the stop determination condition based on the stopping operation. Alternatively, for example, a condition in which a braking force from a brake is greater than a predetermined threshold value (for example, a condition in which the brake pedal pressure BK is greater than the predetermined threshold value Pbks1) may be used as the stop determination condition based on the stopping operation. Alternatively, for example, the condition in which the shift lever is located at the P range may be used as the stop determination condition based on the stopping operation.

The stop determination condition based on the stopping operation may not be an operation for directly stopping the vehicle 1 but may be a stop determination condition based on an operation capable of causing the vehicle 1 to stop. An example of the operation capable of causing the vehicle 1 to stop is an operation (for example, an operation of detaching a foot from an accelerator pedal) that is likely to be performed before the vehicle stops. Accordingly, for example, a condition in which the accelerator pedal is not operated may be used as the stop determination condition based on the stopping operation.

Alternatively, the stop determination condition based on the stopping operation may be a condition relevant to another operation caused by the stopping operation. Examples of the operation caused by the stopping operation include an operation of setting a creep torque command value to zero and an operation of setting a torque command value of the motor-generator MG2 to zero. Accordingly, the condition in which the creep torque command value is zero or the condition in which the torque command value of the motor-generator MG2 is zero may be used as the stop determination condition based on the stopping operation.

When it is determined in step S100 that the stop determination condition is not satisfied (NO in step S100), the stop determining unit 172 determines that the motor-generator MG2 does not stop (step S109). Specifically, when it is determined that the absolute value of the rotation speed Ne2 of the motor-generator MG2 is greater than the predetermined threshold value N1 ($|Ne2|>N1$), the stop determining unit 172 determines that the motor-generator MG2 does not stop. Similarly, when it is determined that the brake pedal pressure BK is equal to or less than the predetermined threshold value Pbks1 (BK≤Pbks1), the stop determining unit 172 determines that the motor-generator MG2 does not stop.

When it is determined that the motor-generator MG2 does not stop, the ECU 17 ends the process flow. Here, the ECU 17 may perform the operations subsequent to step S100 again.

On the other hand, when it is determined in step S100 that the stop determination condition is satisfied (YES in step S100), the stop determining unit 172 starts a timer for measuring a predetermined period (step S101).

After starting the timer, the stop determining unit 172 determines whether the state in which the stop determination condition is satisfied is maintained (step S102).

When it is determined in step S102 that the state in which the stop determination condition is satisfied is not maintained (NO in step S102), the stop determining unit 172 determines that the motor-generator MG2 does not stop (step S109). That is, when it is determined that the stop determination condition is not satisfied before the timer ends, the stop determining unit 172 determines that the motor-generator MG2 does not stop. In other words, when it is determined that the state in which the stop determination condition is satisfied is not maintained for a predetermined period or more, the stop determining unit 172 determines that the motor-generator MG2 does not stop.

On the other hand, when it is determined in step S102 that the state in which the stop determination condition is satisfied is maintained (YES in step S102), the stop determining unit 172 repeatedly performs the operation (step S102) of determining whether the state in which the stop determination condition is satisfied is maintained until the timer ends (step S103).

Thereafter, when the timer ends (YES in step S103), the stop determining unit 172 determines that the motor-generator MG2 stops (in step S104). That is, when it is determined that the stop determination condition is continuously satisfied until the timer ends after the timer starts, the stop determining unit 172 determines that the motor-generator MG2 stops. In other words, when it is determined that the state in which the stop determination condition is satisfied is maintained for a predetermined period or more, the stop determining unit 172 determines that the motor-generator MG2 stops.

Figure 3:
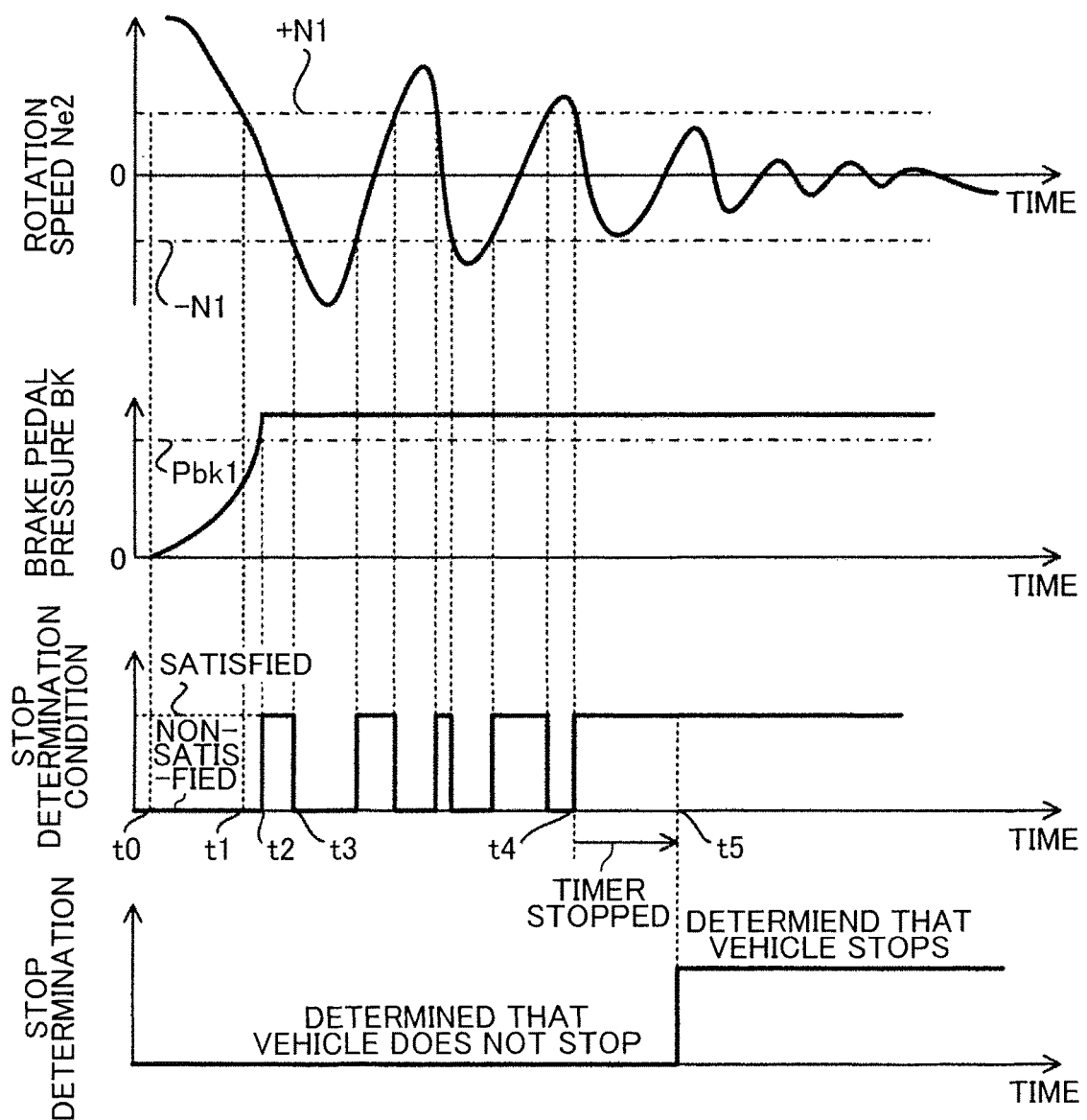
FIG. 3 is a timing chart illustrating a rotation speed, a brake pedal pressure, and determination results of whether a stop determination condition is satisfied and whether, a vehicle stops.

The operation of determining whether the motor-generator MG2 stops will be described below using specific examples of the rotation speed Ne2 and the brake pedal pressure BK with reference to FIG. 3. FIG. 3 is a timing chart illustrating the rotation speed Ne2, the brake pedal pressure BK, and the determination results of whether the stop determination condition is satisfied and whether the vehicle 1 stops.

As illustrated in FIG. 3, the brake pedal pressure BK increases with the start of an operation of a foot brake at time t0. With the increase in the brake pedal pressure BK, the rotation speed Ne2 decreases.

When the vehicle 1 is intended to stop due to the operation of the foot brake or the like, the drive shaft 15 of the vehicle 1 is likely to be twisted. As a result, the rotation speed of the drive shaft 15 is likely to hunt with the twisting of the drive shaft 15. In consideration of the configuration in which the rotation shaft of the motor-generator MG2 is connected to the drive shaft 15, the rotation speed Ne2 of the motor-generator MG2 is also likely to hunt. FIG. 3 illustrates the hunting of the rotation speed Ne2 (an upper limit variation of the rotation speed Ne2 which slowly converges in FIG. 3).

Thereafter, at time t1, the absolute value of the rotation speed Ne2 becomes equal to or less than the predetermined threshold value N1. Here, at time t1, the brake pedal pressure BK does not become greater than the predetermined threshold value Pbk1. Accordingly, the stop determination condition is not satisfied.

Thereafter, at time t2, the brake pedal pressure BK becomes greater than the predetermined threshold value Pbk1. Accordingly, at time t2, the stop determination condition is satisfied. Here, at time t2, since the state in which the stop determination condition is satisfied is not maintained for a predetermined period or more, the stop determining unit 172 does not determine that the motor-generator MG2 stops.

Thereafter, at time t3 which is a time (that is, a time before the timer starting at time t2 ends) before a predetermined period does not elapse from time t2, the absolute value of the rotation speed Ne2 becomes greater than the predetermined threshold value N1 due to the influence of the hunting. That is, at time t3, the stop determination condition is not satisfied. As a result, the stop determining unit 172 does not determine that the motor-generator MG2 stops.

Thereafter, the absolute, value of the rotation speed Ne2 is equal to or less than the predetermined threshold value N1 until reaching time t4, but the state in which the stop determination condition is satisfied is not maintained for a predetermined period or more. Accordingly, in this case, the stop determining unit 172 does not determine that the motor-generator MG2 stops.

Thereafter, at time t4, the absolute value of the rotation speed Ne2 becomes equal to or less than the predetermined threshold value N1 again. Accordingly, at time t4, the stop determination condition is satisfied. Here, at time t4, since the state in which the stop determination condition is satisfied is not maintained for a predetermined period or more, the stop determining unit 172 does not determine that the motor-generator MG2 stops.

Thereafter, at time t5 which is a time (a time at which the timer starting at time t2 ends) at which a predetermined period elapses after time t4, the stop determination condition is continuously satisfied. Accordingly, in the example illustrated in FIG. 3, the stop determining unit 172 determines that the motor-generator MG2 stops at the first time at time t5.

Figure 4:
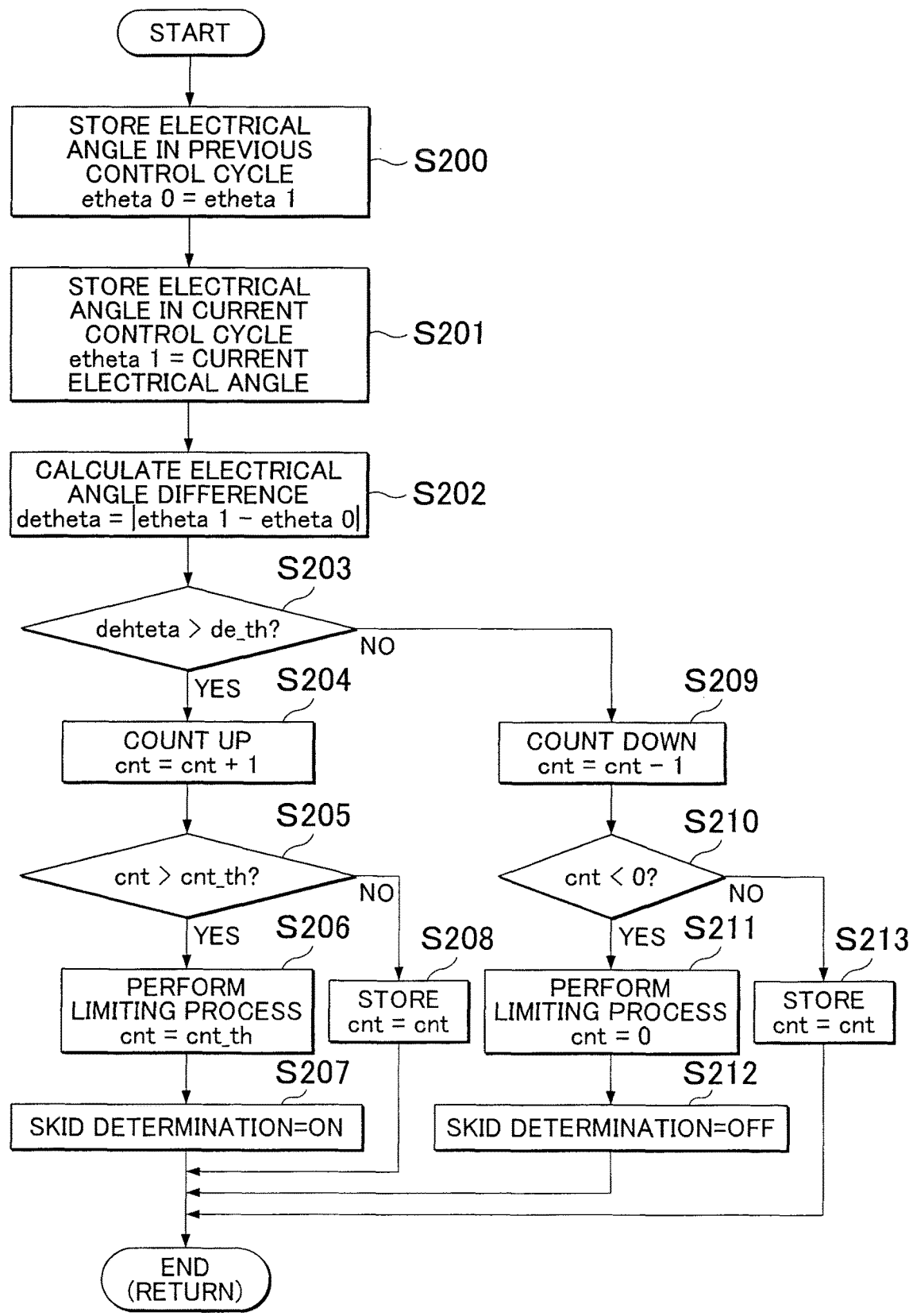
FIG. 4 is a flowchart illustrating a flow of a skid determining process in the first embodiment.

Referring to FIG. 2 gain, when it is determined that the motor-generator MG2 stops, the skid determining unit 173 determines whether the vehicle 1 skids (step S104b). The determination of whether the vehicle 1 skids will be described with reference to FIG. 4. FIG. 4 is a flowchart illustrating a flow of a skid determination process in the first embodiment.

In FIG. 4, in the skid determination in the first embodiment, an electrical angle of a previous control cycle of the motor-generator MG2 is first stored (step S200). Specifically, the value etheta 1 which is hitherto stored as the electrical angle of the current control cycle is stored as the value etheta 0 of the electrical angle of the previous control cycle. Subsequently, the electrical angle of the current control cycle of the motor-generator MG2 is stored (step S201). Specifically, the value (that is, the newly-detected value of the electrical angle) of the current electrical angle of the motor-generator MG2 is stored as the value etheta 1 of the electrical angle of the current control cycle. Here, the value of the electrical angle is used, but a value of a mechanical angle may be used instead of the electrical angle.

Thereafter, an electrical angle difference detheta between the electrical angle etheta 0 of the previous control cycle and the electrical angle etheta 1 of the current control cycle is calculated (step S202). Subsequently, the calculated electrical angle difference detheta is compared with a predetermined threshold value de_th and it is determined whether the electrical angle difference detheta is greater than the predetermined threshold value de_th (step S203). The threshold value de_th can be set in advance to a value corresponding to the electrical angle difference of the motor-generator MG2 when a skid occurs by simulation or the like.

When it is determined that the electrical angle difference detheta is greater than the predetermined threshold value de_th (YES in step S203), a value cnt indicating a period in which the state in which the electrical angle difference detheta is greater than the predetermined threshold value de_th is maintained is counted up (step S204). In other words, the value of cnt increases. The initial value of cnt is typically set to 0.

Thereafter, it is determined whether the value of cnt is greater than a predetermined threshold value cnt_th (step S205). The threshold value cnt_th is a value which is set as a determination period for preventing erroneous skid determination. Specifically, it is not determined that a skid occurs when the electrical angle difference detheta is greater than the predetermined threshold value de_th but the maintenance period is equal to or less than the threshold value cnt_th, and it is determined that a skid occurs when the period in which the electrical angle difference detheta is greater than the predetermined threshold value de_th is maintained for longer than the threshold value cnt_th.

When it is determined that the value of cnt is greater than the predetermined threshold value cnt_th (YES in step S205), a limiting process is performed to set the value of cnt to be equal to the predetermined threshold value cnt_th (step S206). That is, in the limiting process, the value of cnt is adjusted so as not to be greater than the threshold value cnt_th. After the limiting process is performed, skid determination is set to ON (step S207). Accordingly, the determination result that the vehicle 1 skids is output from the skid determining unit 173. When it is determined that the value of cnt is equal to or less than the threshold value cnt_th (NO in step S205), a series of processes ends with the value of cnt stored (step S208).

On the other hand, when it is determined in step S203 that the electrical angle difference detheta is equal to or less than the threshold value de_th (NO in step S203), the value of cnt is counted down (step S209). In other words, the value of cnt decreases.

Thereafter, it is determined whether the value of cnt is less than 0 (step S210). Here, "0" is a threshold value for releasing the skid determination. Specifically, when the state in which the electrical angle difference detheta is equal to or less than the threshold value de_th is maintained and the value of cnt becomes 0, it is determined that a skid does not occur. When the electrical angle difference detheta is less than the predetermined threshold value de_th but the value of cnt is not less than 0, it is not determined that a skid does not occur.

On the other hand, when it is determined that the value of cnt is less than 0 (YES in step S210), a limiting process is performed to set the value of cnt to 0 (step S211). That is, in the limiting process, the value of cnt is adjusted so as not to be less than 0. After the limiting process is performed, the skid determination is set to OFF (step S212). Accordingly, the determination result that the vehicle 1 does not skid is output from the skid determining unit 173. When it is determined that the value of cnt is not less than 0 (NO in step S205), a series of processes ends with the value of cnt stored (step S213).

The above-mentioned series of processes is repeatedly performed and it can be determined whether a skid occurs on the basis of the variation in cnt as a result.

Referring to FIG. 2 again, in the first embodiment when it is determined that the motor-generator MG2 stops and the vehicle 1 does not skid (NO in step S104b), the inverter control unit 171 controls the operation of the inverter 13 so as to perform three-phase short-circuit control of fixing the state of the motor-generator MG2 to a three-phase short-circuit state (step S105). That is, the inverter control unit 171 controls the operation of the inverter 13 so as to turn on all the switching elements in one arm of the upper arm and the lower arm and to turn off all the switching elements in the other arm. For example, the inverter control unit 171 may control the operation of the inverter 13 so as to turn on the p-side switching element Q1, the p-side switching element Q3, and the p-side switching element Q5 and to turn off the n-side switching element Q2, the n-side switching element Q4, and the n-side switching element Q6. On the other hand, when it is determined that the vehicle 1 skids (YES in step S104b), the stop determining unit 172 determines that the motor-generator MG2 does not stop (step S109).

In step S105, the inverter control unit 171 may control the operation of the inverter 13 so as to perform two-phase short-circuit control of fixing the state of the motor-generator MG2 to a two-phase short-circuit state. That is, the inverter control unit 171 may control the operation of the inverter 13 so as to turn on two switching elements in one arm of the upper arm and the lower arm and to turn off the other switching element in the one arm and all the switching elements in the other arm of the upper arm and the lower arm.

Alternatively, in step S105, the inverter control unit 171 may control the operation of the inverter 13 so as to perform control of fixing the state of the inverter 13 to a state in which only one switching element of the six switching elements of the inverter 13 is turned on (on the other hand, the other five switching elements are turned off).

In the first embodiment, when it is determined that the motor-generator MG2 stops, the electric leakage detector 19 detects electric leakage of the electric system while the three-phase short-circuit control is performed (step S105). Since at least one switching element of the six switching elements in the inverter 13 is turned on, the electric leakage detector 19 can detect electric leakage of an AC part (that is, a circuit part closer to the motor-generator MG2 than to the inverter 13 in the electric system) as well as electric leakage of a DC part (that is, a circuit part closer to the DC power source 11 than to the inverter 13 in the electric system).

In parallel with the operation of step S105, the stop determining unit 172 determines whether a predetermined stop release condition is satisfied (step S106). In the first embodiment, similarly to the stop determination condition, the stop release condition includes a stop release condition based on the rotation speed Ne2 of the motor-generator MG2, a stop release condition based on the stopping operation, and a stop release condition based on the determination of whether the vehicle skids. In FIG. 2, a condition in which the absolute value of the rotation speed Ne2 of the motor-generator MG2 is greater than a predetermined threshold value N2 (|Ne2|>N2 is satisfied) is used as an example of the stop release condition based on the rotation speed Ne2. The predetermined threshold value N2 may be equal to the predetermined threshold value N1 or may be different from the predetermined threshold value N1. Similarly, in FIG. 2, a condition in which the brake pedal pressure BK is less than a predetermined threshold value Pbks2 (BK<Pbks2 is satisfied) is used as an example of the stop release condition based on the stopping operation. The predetermined threshold value Pbks2 may be equal to the predetermined threshold value Pbks1 or may be different from the predetermined threshold value Pbks1. In FIG. 2, a condition in which the vehicle skids is used as an example of the stop release condition based on the determination of whether the vehicle skids.

The stop release conditions illustrated in FIG. 2 are only examples. Accordingly, a stop release condition other than the stop release conditions illustrated in FIG. 2 may be used.

The stop release condition may be appropriately determined from the same viewpoint as the stop determination conditions.

In step S106, the stop determining unit 172 may determine whether a corresponding stop determination condition is satisfied, in addition to or instead of the determination of whether the stop release condition based on the rotation speed Ne2 of the motor-generator MG2 or the stop release condition based on the stopping operation is satisfied. In this case, when it is determined that the stop determination condition is not satisfied, the subsequent operations may be performed in the same aspect as the case in which the stop release condition is satisfied. On the other hand, when it is determined that the stop determination condition is satisfied, the subsequent operations may be performed in the same aspect as the case in which the stop release condition is not satisfied.

When it is determined in step S106 that the stop release condition is not satisfied (NO in step S106), the inverter control unit 171 continues to control the operation of the inverter 13 so as to continue to perform the three-phase short-circuit control. Similarly, the electric leakage detector 19 continues to detect the electric leakage of the electric system.

On the other hand, when it is determined in step S106 that the stop release condition is satisfied (YES in step S106), the stop determining unit 172 determines that the motor-generator MG2 does not stop (step S107). In this case, the inverter control unit 171 may control the operation of the inverter 13 so as not to perform the three-phase short-circuit control of fixing the state of the motor-generator MG2 to the three-phase short-circuit state (step S108). Similarly, the electric leakage detector 19 ends the detection of electric leakage of the electric system (step S108).

Thereafter, the ECU 17 ends the flow of operations. Here, the ECU 17 may perform the operations subsequent to step S100 again.

As described above, in the first embodiment, the stop determining unit 172 can determine whether the motor-generator MG2 (or the vehicle 1) stops on the basis of both the stop determination condition based on the rotation speed Ne2 of the motor-generator MG2 and the stop determination condition based on the stopping operation. Accordingly, the stop determining unit 172 can determine whether the motor-generator MG2 (or the vehicle 1) stops with higher accuracy, compared with a stop determining unit 172a of a first comparative example that determines whether the vehicle 1 stops on the basis of only the stop determination condition based on the rotation speed of the engine. The stop determining unit 172 can determine whether the motor-generator MG2 (or the vehicle 1) stops with higher accuracy, compared with a stop determining unit 172b of a second comparative example that determines whether the motor-generator MG2 (or the vehicle 1) stops on the basis of only the stop determination condition based on the rotation speed Ne2 of the motor-generator MG2. The reason thereof will be described below.

First, the stop determining unit 172a of the first comparative example that determines that the vehicle 1 stops when the rotation speed of the engine is equal to or less than a predetermined threshold value instead of the rotation speed Ne2 of the motor-generator MG2 will be described below. The rotation speed of the engine is typically calculated from a crank angle of the engine, instead of being directly detected the rotation speed through the use of a detection mechanism. The crank angle of the engine is output from a crank angle sensor installed in the engine. However, the accuracy of the rotation speed of the engine calculated from the crank angle is often lower than the accuracy of the rotation speed Ne2 of the motor-generator MG2 detected by the rotation angle sensor 14 (that is, the detection mechanism that directly detects the rotation speed Ne2 of the motor-generator MG2). Accordingly, the stop determining unit 172a of the first comparative example may erroneously determine that the vehicle 1 stops, though the vehicle 1 does not stop, due to an accuracy error of the rotation speed of the engine calculated from the crank angle. Alternatively, the stop determining unit 172a of the first comparative example may erroneously determine that the vehicle 1 does not stop, though the vehicle 1 stops.

Therefore, the stop determining unit 172 of the first embodiment can determine whether the motor-generator MG2 (or the vehicle 1) stops on the basis of the rotation speed Ne2 of the motor-generator MG2 detected by the rotation angle sensor 14. In consideration of the fact that the accuracy of the rotation speed Ne2 of the motor-generator MG2 detected by the rotation angle sensor 14 is often higher than the accuracy of the rotation speed of the engine calculated from the crank angle, the stop determining unit 172 of the first embodiment can determine whether the motor-generator MG2 (or the vehicle 1) stops with relatively high accuracy, compared with the stop determining unit 172a of the first comparative example.

The stop determining unit 172b of the second comparative example that does not determine whether the stopping operation is performed but determines that the motor-generator MG2 (or the vehicle 1) stops when the rotation speed Ne2 of the motor-generator MG2 is equal to or less than a predetermined threshold value N1 will be described below. The stop determining unit 172b of the second comparative example can determine whether the vehicle 1 stops with relatively high accuracy in comparison with the stop determining unit 172a of the first comparative example. However, the rotation speed Ne2 of the motor-generator MG2 detected by the rotation angle sensor 14 may fluctuate with the influence of noise or the like occurring in the rotation angle sensor 14. For example, there is a possibility that the rotation speed Ne2 of the motor-generator MG2 detected by the rotation angle sensor 14 has, a value other than zero, though the actual rotation speed of the motor-generator MG2 is zero. Accordingly, the stop determining unit 172b of the second comparative example may erroneously determine that the motor-generator MG2 (or the vehicle 1) stops, though the motor-generator MG2 (or the vehicle 1) does not stop, in some cases. Alternatively, the stop determining unit 172b of the second comparative example may erroneously determine that the motor-generator MG2 (or the vehicle 1) does not stop, though the motor-generator MG2 (or the vehicle 1) stops, in some cases.

The stop determining unit 172 of the first embodiment can determine whether the motor-generator MG2 (or the vehicle 1) stops on the basis of the stopping operation; as well as the rotation speed Ne2 of the motor-generator MG2. Here, when the stopping operation is performed, there is a higher possibility that the motor-generator MG2 (or the vehicle 1) stops. Accordingly, the stop determining unit 172 of the first embodiment can determine whether the motor-generator MG2 (or the vehicle 1) stops with relatively high accuracy, compared with the stop determining unit 172b of the second comparative example.

The stop determining unit 172 can determine that the motor-generator MG2 (or the vehicle 1) stops when it is determined that the state in which the stop determination condition is satisfied is maintained for a predetermined period or more. Accordingly, the stop determining unit 172 can determine whether the motor-generator MG2 (or the vehicle 1) stops with higher accuracy even when the rotation speed Ne2 of the motor-generator MG2 hunts (or fluctuates).

Specifically, when the rotation speed of the motor-generator MG2 hunts, a state in which the rotation speed Ne2 is equal to or less than the predetermined threshold value N1 and a state in which the rotation speed Ne2 is not equal to or less than the predetermined threshold value N1 alternately appear. In this situation, when it is determined that the motor-generator MG2 (or the vehicle 1) stops when the rotation speed Ne2 is merely equal to or less than the predetermined threshold value N1, the determination result of whether the motor-generator MG2 (or the vehicle 1) stops may be frequently changed.

In the first embodiment, the stop determining unit 172 can determine that the motor-generator MG2 (or the vehicle 1) does not stop when it is determined that the rotation speed Ne2 is equal to or less than the predetermined threshold value N1 for only a short time due to the hunting or the like. On the other hand, the stop determining unit 172 can determine that the motor-generator MG2 (or the vehicle 1) stops when it is determined that the rotation speed Ne2 is equal to or less than the predetermined threshold value N1 continuously for a certain long period due to the convergence of the hunting or the like. Accordingly, the stop determining unit 172 can determine whether the motor-generator MG2 (or the vehicle 1) stops while suppressing the frequent change of the determination result of whether the motor-generator MG2 (or the vehicle 1) stops due to the influence of the hunting or the like.

The inverter control unit 171 of the first embodiment controls the inverter 13 so as to perform the three-phase short-circuit control while it is determined that the motor-generator MG2 (or the vehicle 1) stops and that the vehicle 1 does not skid.

Here, there is a possibility that electric power required for outputting the torque necessary for causing the vehicle 1 to run will not be supplied to the motor-generator MG2 from the inverter 13, while the three-phase short-circuit control is being performed. Accordingly, it is preferable that the inverter control unit 171 control the inverter 13 so as to perform the three-phase short-circuit control while the motor-generator MG2 (or the vehicle 1) is stopping. On the contrary, when the three-phase short-circuit control is performed while the motor-generator MG2 (or the vehicle 1) is not stopping, the running of the vehicle 1 may be affected. Accordingly, it is preferable that the inverter control unit 171 control the inverter 13 so as not to perform the three-phase short-circuit control while the motor-generator MG2 (or the vehicle 1) is not topping. As a result, in the first embodiment, the stop determining unit 172 can determine whether the motor-generator MG2 (or the vehicle 1) stops with high accuracy as described above. Accordingly, the inverter control unit 171 can control the inverter 13 so as to perform the three-phase short-circuit control while the motor-generator MG2 (or the vehicle 1) is stopping. That is, the inverter control unit 171 can control the inverter 13 so as to perform the three-phase short-circuit control at the timing at which the running of the vehicle 1 is not affected.

Figure 5:
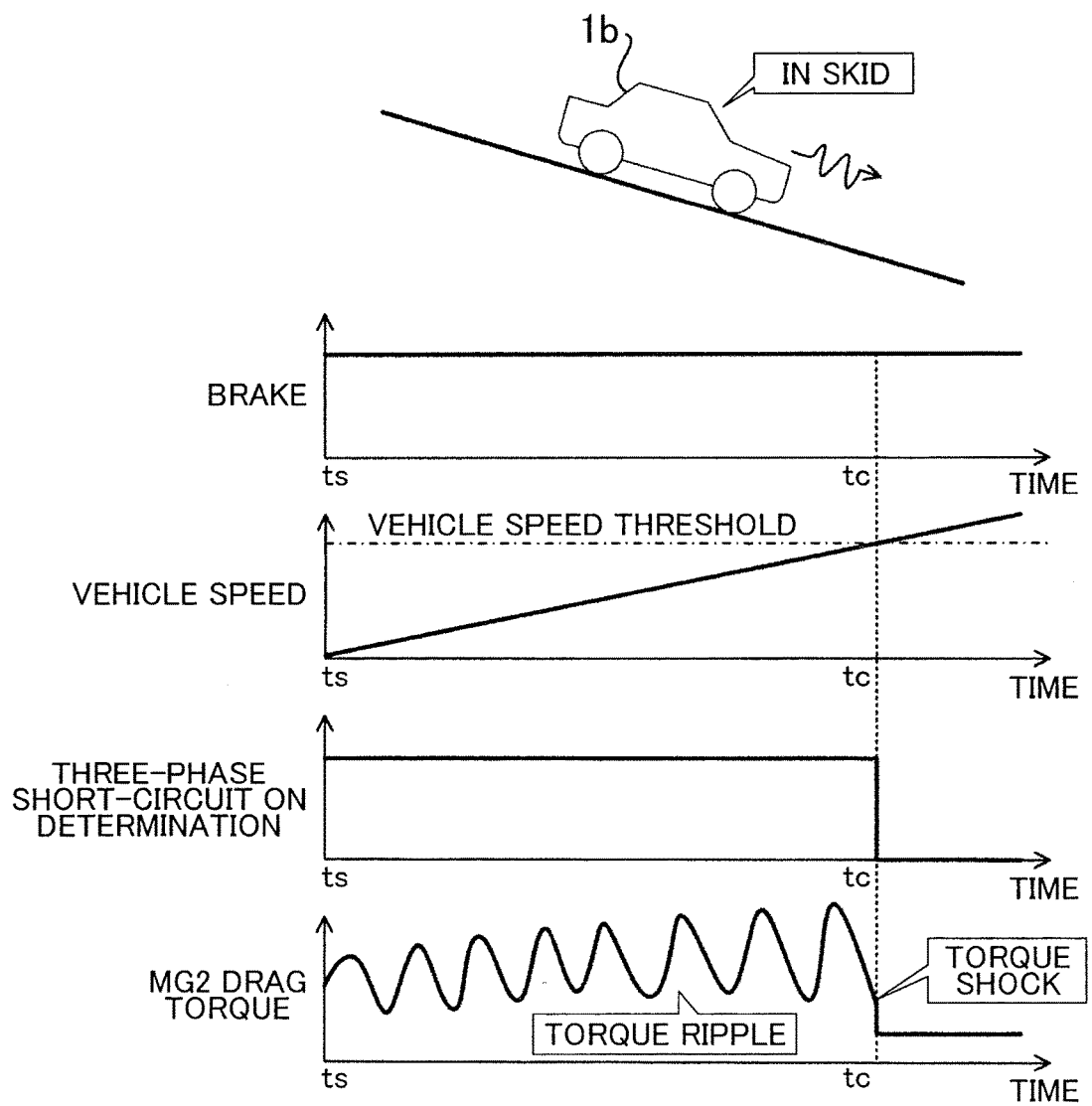
FIG. 5 is a timing chart illustrating variations of various parameters at the time of three-phase short circuit control in a comparative example.
Figure 6:
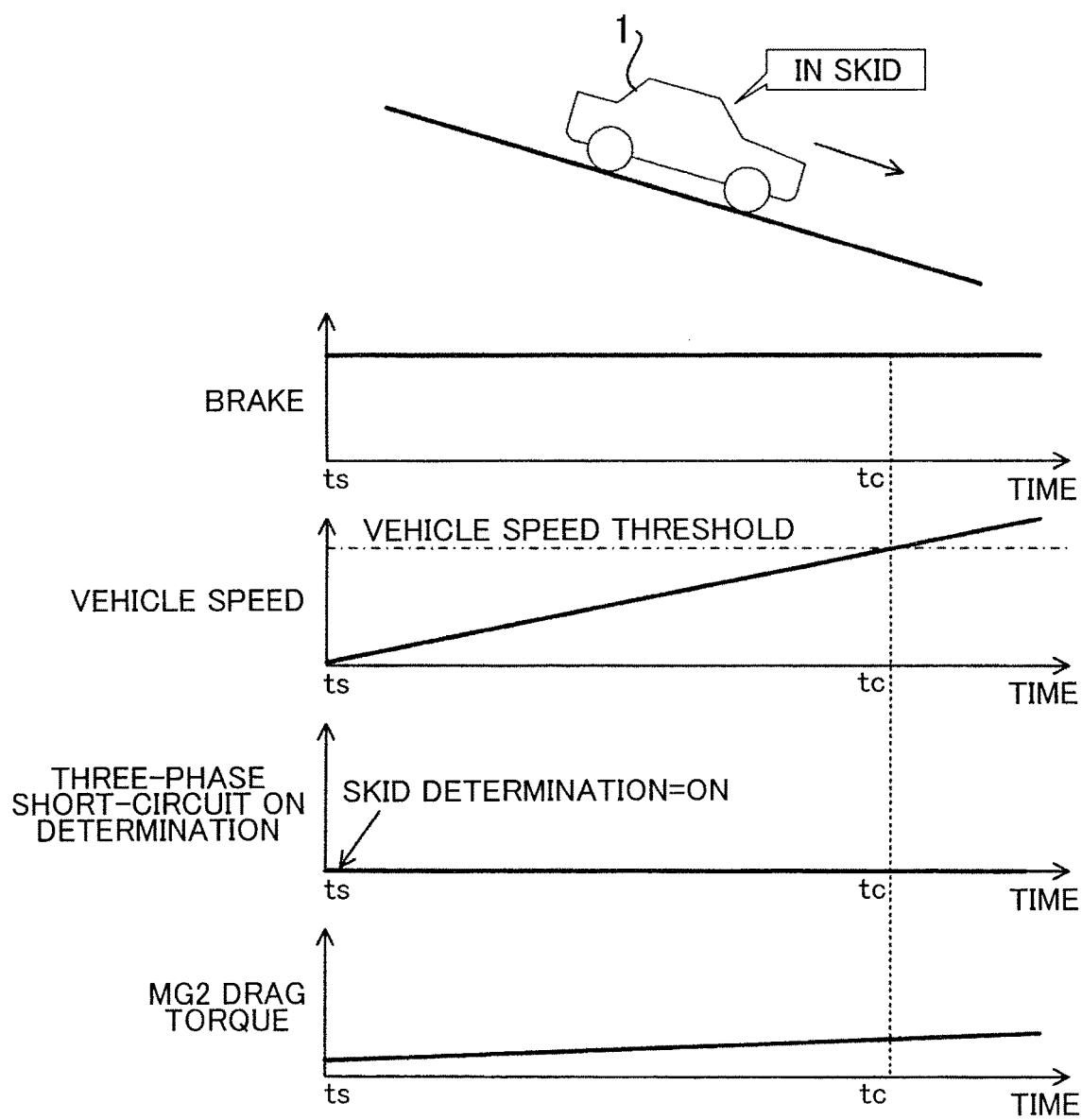
FIG. 6 is a timing chart illustrating variations of various parameters at the time of three-phase short-circuit control in the first embodiment.

When the vehicle 1 skids while the inverter 13 is performing the three-phase short-circuit control, the vehicle vibration due to the torque ripple of the drag torque of the motor-generator MG2 or the torque shock due to the control of the inverter 13 (specifically, the release of the three-phase short-circuit control) in a state where the vehicle speed is relatively high may occur. The advantages of the first embodiment (see FIG. 6) in which it can be determined whether the vehicle skids will be described below with reference to a comparative example (see FIG. 5) in which the above-mentioned problems occur. FIG. 5 is a timing chart illustrating variations of various parameters at the time of performing the three-phase short-circuit control in the comparative example, and FIG. 6 is a timing chart illustrating variations of various parameters at the time of performing the three-phase short-circuit control in the first embodiment. In FIGS. 5 and 6, a situation in which a skid occurs and thus the vehicle speed slowly increases after the vehicle 1 stops in the way of the slope is exemplified.

A vehicle 1b according to the comparative example illustrated in FIG. 5 is configured not to perform the skid determination, unlike the vehicle 1 according to the first embodiment. Accordingly, in the vehicle 1b according to the comparative example, the three-phase short-circuit control of the motor-generator MG2 is started on the basis of only the stop determination. More specifically, when it is determined in step S104 illustrated in FIG. 2 that the motor-generator MG2 (or the vehicle 1) stops, the three-phase short-circuit control of the motor-generator MG2 in step S105 is started (without performing the determination of step S104b). Accordingly, at time 0 at which the vehicle 1b stops, the motor-generator MG three-phase short-circuit control is set to ON.

When the vehicle speed increases by a skid after the vehicle 1b stops, a drag torque is generated in the motor-generator MG2. In this way, when the drag torque is generated in a state where the three-phase short-circuit control is performed, the torque ripple illustrated in the drawing is generated and the drag fluctuates with a fine cycle. Accordingly, vibration occurs in the vehicle 1.

In the vehicle 1b according to the comparative example, it is determined that the vehicle does not stop at time tc at which the vehicle speed reaches a threshold value and the three-phase short-circuit control of the motor-generator MG2 is released. In this way, when the three-phase short-circuit control is released in a state where the vehicle speed is relatively high, the drag torque of the motor-generator MG2 rapidly decreases and thus torque shock occurs.

As described above, in the vehicle 1b according to the comparative example, drivability may decrease due to the influence of the torque ripple and the torque shock.

On the other hand, in the vehicle 1 according to the first embodiment illustrated in FIG. 6, the three-phase short-circuit control is not performed in a state where the vehicle 1 skids. Accordingly, the torque ripple generated between time is to time tc in FIG. 5 is not generated. At time tc at which the vehicle speed reaches the threshold value, since the three-phase short-circuit control is already released, the torque shock does not occur. In this way, in the vehicle 1 according to the first embodiment, it is possible to prevent the decrease in drivability by using the skid determination.

The electric leakage detector 19 of the first embodiment can detect electric leakage while it is determined that the motor-generator MG2 (or the vehicle 1) stops and it is determined that the vehicle 1 does not skid (in other words, while the inverter 13 is controlled so as to perform the three-phase short-circuit control). When the state of the inverter 13 varies while the electric leakage detector 19 is detecting the electric leakage, the state (for example, the impedance of a path including the above-mentioned electric leakage path) in the electric system may vary due to the variation in the state of the inverter 13. As a result, the electric leakage detector 19 may erroneously recognize the state variation (for example, the variation in voltage of node E) due to the variation in the state of the inverter 13 as a state variation due to the electric leakage. Therefore, from the viewpoint of improvement in detection accuracy of electric leakage by the electric leakage detector 19, the state of the inverter 13 may be fixed to the three-phase short-circuit state (or other states including the two-phase short-circuit state) while the electric leakage detector 19 is detecting the electric leakage.

Here, when the accuracy for determining whether the motor-generator MG2 (or the vehicle 1) stops is relatively low, there is a high possibility that the determination result of whether the motor-generator MG2 (or the vehicle 1) stops will be frequently changed due to the noise or hunting or the like, compared with a case where the determination accuracy is relatively high. As a result, there is a high possibility that the state of the inverter 13 will be frequently changed due to the change of the determination result of whether the motor-generator MG2 (or the vehicle 1) stops. Accordingly, there is a possibility that the period in which the state of the inverter 13 is fixed to the three-phase short-circuit state is shorter than the period required for allowing the electric leakage detector 19 to detect the electric leakage.

For these reasons, when it is determined with high accuracy whether the motor-generator MG2 (or the vehicle 1) stops, the state of the inverter 13 is likely to be fixed to the three-phase short-circuit state. Accordingly, in the first embodiment, the stop determining unit 172 can determine whether the motor-generator MG2 (or the vehicle 1) stops with high accuracy as described above. Therefore, there is a relatively high possibility that the state of the inverter 13 will be fixed (for example, fixed to another state including the three-phase short-circuit, state or the two-phase short-circuit state) while the electric leakage detector 19 is detecting the electric leakage. In this way, the electric leakage detector 19 can detect the electric leakage.

In the above-mentioned description, the vehicle 1 includes the single motor-generator MG2. However, the vehicle 1 may include plural motor-generators MG2. In this case, the vehicle 1 may include the inverter 13 and the rotation angle sensor 14 for each motor-generator MG2. In this case, the ECU 17 may perform the stop determination independently for each motor-generator MG2.

A second embodiment of the invention will be described below. The second embodiment is different from the first embodiment in some operations, and is equal to the first embodiment in the other parts. Accordingly, the parts different from the first, embodiment will be described below in detail and description of the other parts will be appropriately skipped.

Figure 7:
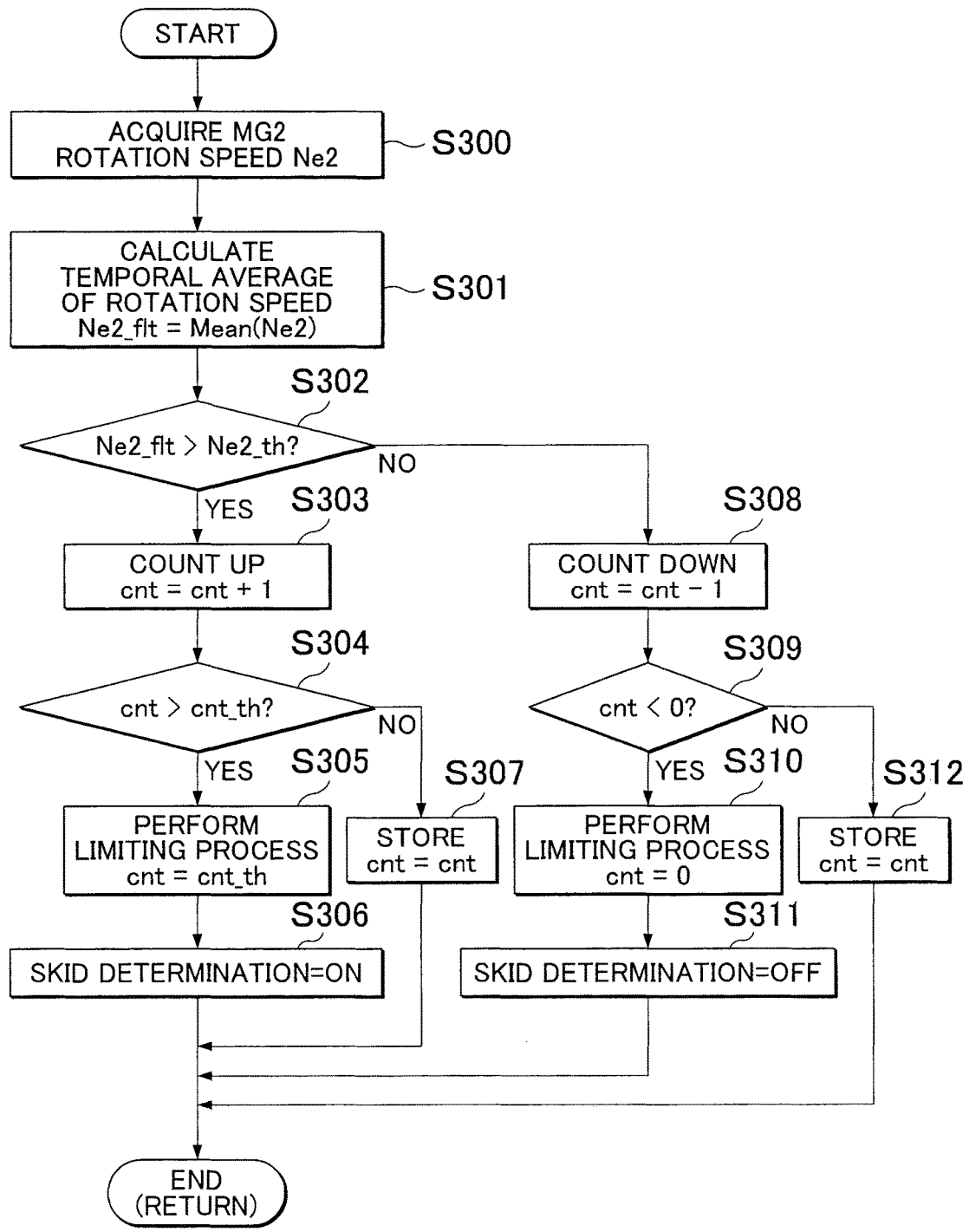
FIG. 7 is a flowchart illustrating a flow of a skid determining process in a second embodiment of the invention.

The second embodiment is different from the first embodiment, particularly, in the skid determination. Accordingly, the skid determination of the second embodiment will be described below with reference to FIG. 7. FIG. 7 is a flowchart illustrating a flow of a skid determination process in the second embodiment.

In FIG. 7, in the skid determination of the second embodiment, the rotation speed Ne2 of the motor-generator MG2 is first acquired (step S300). Subsequently, the temporal average Ne2_flt of the acquired rotation speed Ne2 of the motor-generator MG2 is computed (step S301). When the temporal average of the rotation speed Ne2 is used in this way, it is possible to reduce the influence of noise or the like and to enhance the accuracy of the skid determination as a result.

Thereafter, the computed temporal average Ne2_flt of the rotation speed is compared with a predetermined threshold value Ne2_th and it is determined whether the temporal average Ne2_flt of the rotation speed is greater than the predetermined threshold value Ne2_th (step S302). The threshold value Ne2_th can be set in advance to a value corresponding to the rotation speed of the motor-generator MG2 when a skid occurs by simulation or the like.

When it is determined that the temporal average Ne2_flt of the rotation speed is greater than the predetermined threshold value Ne2_th (YES in step S302), the value cnt indicating a period in which the state in which the temporal average Ne2_flt of the rotation speed is greater than the predetermined threshold value Ne2_th is maintained is counted up (step S303). The processes of steps S304 to S307 which are performed after step S303 are the same as the processes of steps S205 to S208 described with reference to FIG. 4 and thus description thereof will not be repeated.

On the other hand, when it is determined in step S302 that the temporal average Ne2_flt of the rotation speed is equal to or less than the predetermined threshold value Ne2_th (NO in step S302), the value cnt is counted down (step S308). The processes of steps S309 to S312 which are performed after step S308 are the same as the processes of steps S210 to S213 described with reference to FIG. 4 and thus description thereof will not be repeated.

As described above, in the second embodiment, it is determined whether the vehicle skids on the basis of the rotation speed of the motor-generator MG2. In this case, similarly to the first embodiment in which it is determined whether the vehicle skids on the basis of the rotation angle of the motor-generator MG2, it is possible to determine whether the vehicle 1 skids. Accordingly, as described above with reference to FIGS. 5 and 6, it is possible to prevent a decrease in drivability due to the three-phase short-circuit control performed at an improper timing.

A third embodiment of the invention will be described below. The third embodiment is different from the first and second embodiments in some operations, and is equal to the first and second embodiments in the other parts. Accordingly, the parts different from the first and second embodiments will be described below in detail and description of the other parts will be appropriately skipped.

Figure 8:
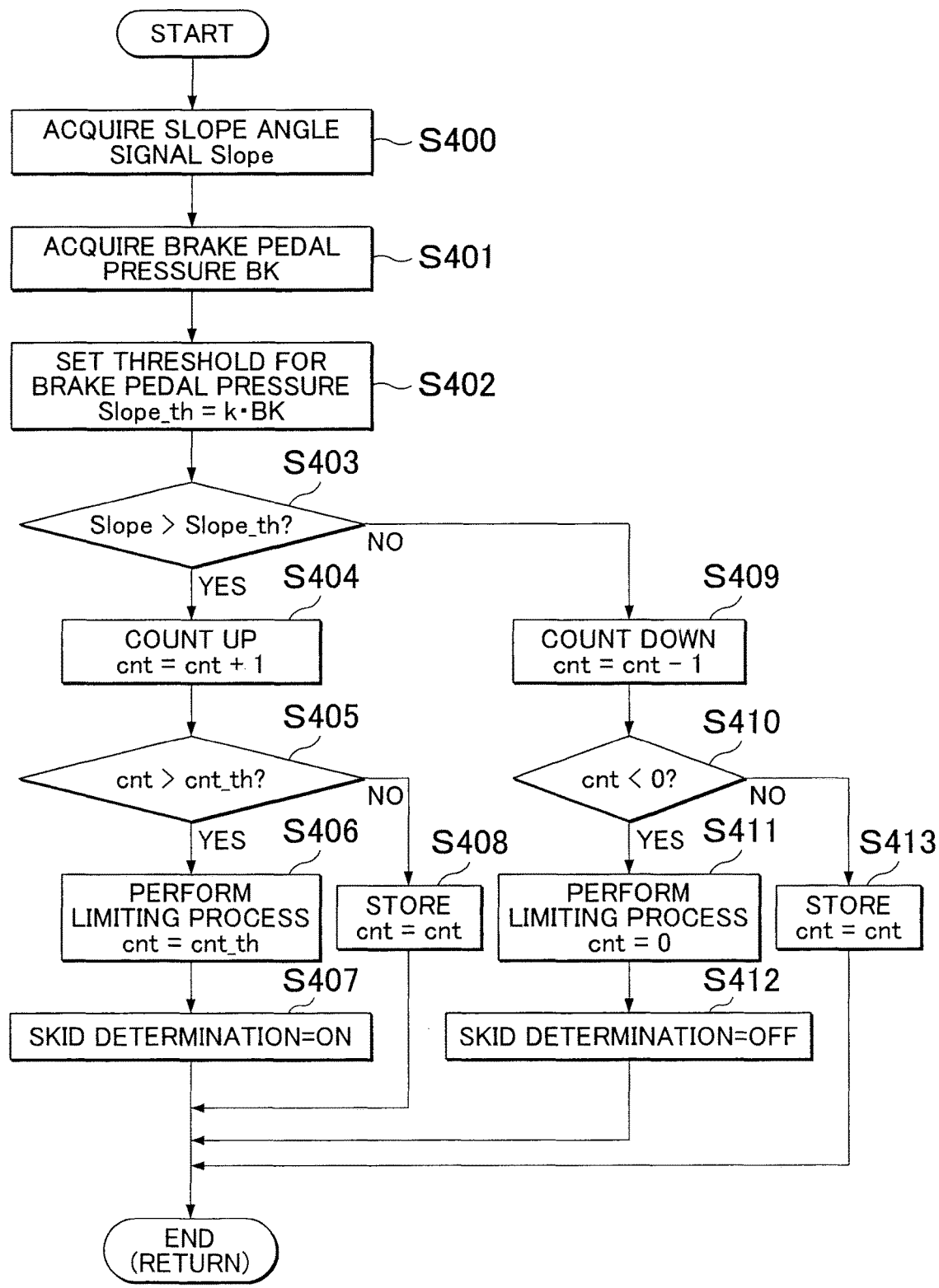
FIG. 8 is a flowchart illustrating a flow of a skid determining process in a third embodiment of the invention.

The third embodiment is different from the first and second embodiments, particularly, in the skid determination. Accordingly, the skid determination of the third embodiment will be described below with reference to FIG. 8. FIG. 8 is a flowchart illustrating a flow of a skid determination process in the third embodiment.

In FIG. 8, in the skid determination of the third embodiment, a slope angle signal indicating a slope Slope of the vehicle 1 is first acquired using a slope angle sensor or the like (step S400). The brake pedal pressure BK is acquired using the brake sensor or the like (step S401).

Thereafter, a threshold value Slope_th of the slope Slope of the vehicle 1 is set on the basis of the acquired brake pedal pressure BK (step S402). For example, the threshold value Slope_th is calculated by multiplying the brake pedal pressure BK by a predetermined correction coefficient k. More specifically, the threshold value Slope_th is calculated as a greater value as the brake pedal pressure BK becomes greater.

Thereafter, the acquired slope Slope of the vehicle 1 is compared with the calculated threshold value Slope_th and it is determined whether the slope Slope of the vehicle 1 is greater than the threshold value Slope_th (step S403). By employing this determination, it is possible to determine whether the vehicle 1 skids on the basis of the slope (that is, the slope of a road) of the vehicle 1. In the third embodiment, since it is determined whether the vehicle skids on the basis of the threshold value Slope_th, it is possible to further accurately perform the determination.

When it is determined that the slope Slope of the vehicle 1 is greater than, the threshold value Slope_th (YES in step S403), the value cnt indicating a period in which the state in which the slope Slope of the vehicle 1 is greater than the threshold value Slope_th is maintained is counted up (step S404). The processes of steps S405 to S408 which are performed after step S404 are the same as the processes of steps S205 to S208 described with reference to FIG. 4 and thus description thereof will not be repeated.

On the other hand, when it is determined in step S403 that the slope Slope of the vehicle 1 is equal to or less than the threshold value Slope_th (NO in step S403), the value cnt is counted down (step S409). The processes of steps S410 to S413 which are performed after step S409 are the same as the processes of steps S210 to S213 described with reference to FIG. 4 and thus description thereof will not be repeated.

As described above, in the third, embodiment, it is determined whether the vehicle skids on the basis of the slope of the vehicle 1. In this case, similarly to the first embodiment in which it is determined whether the vehicle skids on the basis of the rotation angle of the motor-generator MG2 or the second embodiment in which it is determined whether the vehicle skids on the basis of the rotation speed of the motor-generator MG2, it is possible to determine whether the vehicle 1 skids. Accordingly, as described above with reference to FIGS. 5 and 6, it is possible to prevent a decrease in drivability due to the three-phase short-circuit control performed at an improper timing.

A fourth embodiment of the invention will be described below. The fourth embodiment is different from the first to third embodiments in a part of configuration and in some operations, and is equal to the first to third embodiments in the other parts. Accordingly, the parts different from the first to third embodiments will be described below in detail and description of the other parts will be appropriately skipped.

Figure 9:
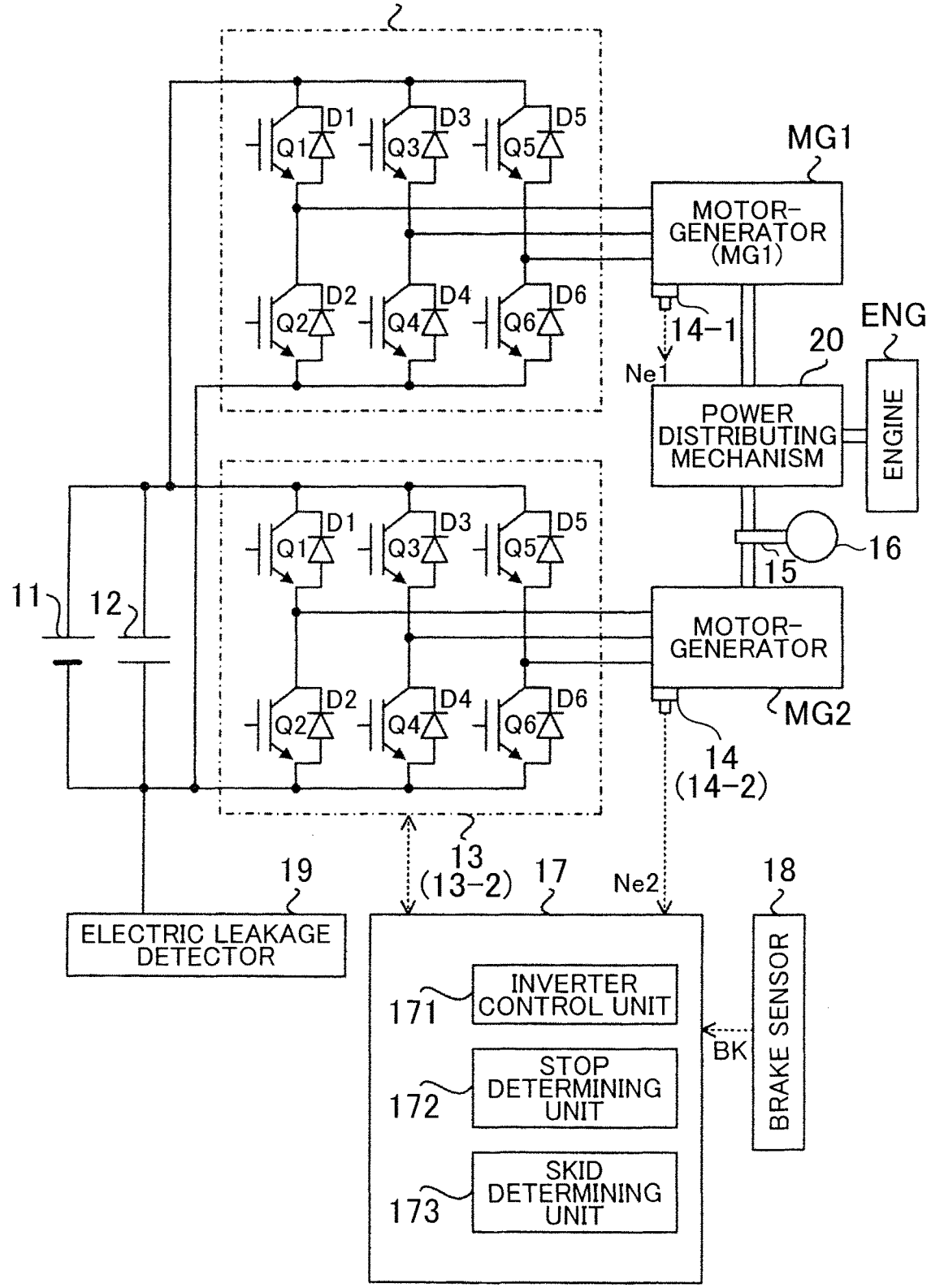
FIG. 9 is a block diagram illustrating a configuration of a vehicle according to a fourth embodiment of the invention.

The fourth embodiment is different from the first and third embodiments in the configuration of the power system. Accordingly, the configuration of a vehicle 2 according to the fourth embodiment will be first described below with reference to FIG. 9. FIG. 9 is a block diagram illustrating a configuration of the vehicle according to the fourth embodiment.

As illustrated in FIG. 9, the vehicle 2 according to the fourth embodiment is different from the vehicle 1 according to the first embodiment illustrated in FIG. 1, in that the vehicle 2 further includes an engine ENG, a motor-generator MG1, an inverter 13-1, a rotation angle sensor 14-1, and a power distributing mechanism 20. The other elements of the vehicle 2 according to the fourth embodiment are the same as the other elements of the vehicle 1 according to the first embodiment. For the purpose of convenience of explanation, in the fourth embodiment, the inverter 13 of the first embodiment is referred to as an inverter 13-2, and the rotation angle sensor 14 according to the first embodiment is referred to as a rotation angle sensor 14-2. For the purpose, of simplification of the drawing, the detailed configuration of the electric leakage detector 19 is not illustrated in FIG. 9, but an electric leakage detector 19 of the fourth embodiment is the same as the electric leakage detector 19 of the first embodiment.

The inverter 13-1 is connected in parallel to the inverter 13-2. The inverter 13-1 converts AC power (three-phase AC voltage) generated by regenerative power generation of the motor-generator MG1 into DC power (DC voltage). As a result, the DC power source 11 is charged with the DC power (DC voltage) generated as the conversion operation result of the inverter 13-1. The configuration of the inverter 13-1 is the same as the configuration of the inverter 13-2 and thus detailed description of the configuration of the inverter 13-1 will not be repeated.

The motor-generator MG1 is a three-phase AC motor-generator. The motor-generator MG1 regenerates (generates) electric power at the time of braking the vehicle 1. Here, the motor-generator MG1 may be driven to generate a torque required for causing the vehicle 2 to run.

The rotation angle sensor 14-1 detects the rotation speed (that is, the rotation speed of the rotation shaft of the motor-generator MG1) Ne1 of the motor-generator MG1. The rotation angle sensor 14-1 may be the same as the rotation angle sensor 14-2.

The engine ENG is an internal combustion engine such as a gasoline engine and serves as a main power source of the vehicle 2.

The power distributing mechanism 20 is a planetary gear mechanism including a sun gear, a planetary carrier, a pinion gear, and a ring gear which are not illustrated. The power distributing mechanism 20 mainly distributes the power of the engine ENG into two systems (that is, a power system for transmitting the power to the motor-generator MG1 and a power system for transmitting the power to the drive shaft 15).

The fourth embodiment describes an example where the vehicle 2 employs a so-called split (power distribution) type hybrid system (for example, Toyota Hybrid System: THS (registered trademark)). However, the vehicle 2 may employ a series type or parallel type hybrid system.

As described above, in the vehicle 2 including the engine ENG and the motor-generator MG1 as power sources, the stop control can be performed by performing the same control as in the first to, third embodiments. That is, by performing the stop determination on the basis of the rotation speed Ne2 of the motor-generator MG2 and the stopping operation, and performing the skid determination on the basis of the rotation angle or the rotation speed of the motor-generator MG2 or the slope of the vehicle, it is possible to perform the three-phase short-circuit control of the motor-generator MG2 at an appropriate timing.

In the fourth embodiment, particularly, in the stop determination and the skid determination, parameters relevant to the motor-generator MG1 or the engine ENG may be considered. Specifically, the stop determination and the skid determination may be performed in consideration of the rotation angle and the rotation speed of the motor-generator MG1 or the engine ENG in addition to the rotation angle and the rotation speed of the motor-generator MG2. Accordingly, it is possible to further improve the accuracy of the stop determination and the skid determination.

In the fourth embodiment, the three-phase short-circuit control of the motor-generator MG1 may be performed in addition to the three-phase short-circuit control of the motor-generator MG2. In this case, the three-phase short-circuit control can be performed at an appropriate timing in consideration of the parameters relevant to the motor-generator MG1 or the engine ENG in addition to the parameters relevant to the motor-generator MG2.

As described above, in the fourth embodiment, it is possible to prevent the three-phase short-circuit control from being performed at an improper timing, similarly to the first to third embodiments. Accordingly, it is possible to prevent a decrease in drivability due to vibration, torque shock, or the like.

The invention is not limited to the above-mentioned embodiments, but can be appropriately modified in various forms without departing from the gist or spirit of the invention that can be read from the appended claims and the entire specification of the invention. Control apparatus of a vehicle according to the modifications are included in the technical scope of the invention.

What is claimed is:

1. A control apparatus for a vehicle, the vehicle including a three-phase AC motor and a power converter, the three-phase AC motor being driven at a rotation speed synchronized with a rotation speed of a drive shaft of the vehicle, and the power converter including a first switching element and a second switching element, which are connected in series to each other, for each of three phases of the three-phase AC motor and being configured to convert electric power supplied to the three-phase AC motor from DC power to AC power, the control apparatus comprising an electronic control unit configured to:
 determine whether the rotation speed of the three-phase AC motor is equal to or less than a predetermined threshold value and whether a stopping operation that stops the vehicle is performed;
 determine that the vehicle stops when the rotation speed of the three-phase AC motor is equal to or less than the predetermined threshold value and the stopping operation is performed;
 determine whether the vehicle skids; and
 switch a state of the power converter to a state where all on one side of the first switching elements and the second switching elements are turned off and at least one on the other side of the first switching elements and the second switching elements is turned on when the electronic control unit determines that the vehicle stops and the vehicle does not skid.

2. The control apparatus for the vehicle according to claim 1, wherein the electronic control unit is configured to determine whether the vehicle skids based on a rotation angle of the three-phase AC motor.

3. The control apparatus for the vehicle according to claim 2, wherein the electronic control unit is configured to determine whether the vehicle skids based on a difference between a current rotation angle of the three-phase AC motor and a previous rotation angle of the three-phase AC motor.

4. The control apparatus for the vehicle according to claim 1, wherein the electronic control unit is configured to determine whether the vehicle skids based on the rotation speed of the three-phase AC motor.

5. The control apparatus for the vehicle according to claim 4, wherein the electronic control unit is configured to determine whether the vehicle skids based on an average value of the rotation speed of the three-phase AC motor in a predetermined period.

6. A control method for a vehicle, the vehicle including a three-phase AC motor and a power converter, the three-phase AC motor being driven at a rotation speed synchronized with a rotation speed of a drive shaft of the vehicle, and the power converter including a first switching element and a second switching element, which are connected in series to each other, for each of three phases of the three-phase AC motor and being configured to convert electric power supplied to the three-phase AC motor from DC power to AC power, the control method comprising:

determining whether the rotation speed of the three-phase AC motor is equal to or less than a predetermined threshold value and whether a stopping operation that stops the vehicle is performed;

determining that the vehicle stops when the rotation speed of the three-phase AC motor is equal to or less than the predetermined threshold value and the stopping operation is performed;

determining whether the vehicle skids; and switching a state of the power converter to a state where all on one side of the first switching elements and the second switching elements are turned off and at least one on the other side of the first switching elements and the second switching elements is turned on when it is determined that the vehicle stops and it is determined that the vehicle does not skid.

* * * * *